United States Patent [19]

Strasburg et al.

[11] 3,953,987

[45] May 4, 1976

[54] AIRCRAFT ENGINE FLEXIBLE FLUID DAMPED COUPLING

[75] Inventors: Richard N. Strasburg, Williamsport; Ezra F. Critchlow, Addison, both of Pa.

[73] Assignee: Avco Corporation, Williamsport, Pa.

[22] Filed: Jan. 22, 1975

[21] Appl. No.: 543,178

[52] U.S. Cl. .................................. 64/27 R; 64/6; 64/15 C; 64/26
[51] Int. Cl.² .......................................... F16D 3/14
[58] Field of Search ............... 64/27 R, 26, 27 NM, 64/15 R, 15 C, 14, 27 C, 6

[56] References Cited
UNITED STATES PATENTS

| | | | |
|---|---|---|---|
| 1,464,220 | 8/1923 | Sachs et al. | 64/26 |
| 2,006,578 | 7/1935 | Tate | 64/26 |
| 2,394,405 | 2/1946 | Schjolin | 64/27 R |
| 2,397,700 | 4/1946 | Sloan | 64/27 R |
| 3,122,902 | 3/1964 | Blair et al. | 64/27 R |

Primary Examiner—Samuel Scott
Assistant Examiner—Randall Heald
Attorney, Agent, or Firm—Charles M. Hogan

[57] ABSTRACT

The flexible mechanical coupling herein shown comprises a drive member, flange and internally notched barrel in rigid relationship. The flange is a part of a helically formed coil-like torsion spring. An externally toothed sleeve is in concentric relationship to the barrel with its teeth in loose engagement with the notches The driven element and the sleeve and the end of the torsion spring remote from the flanged end are secured in rigid relationship. The reservoir within the barrel is filled with viscous damping fluid.

5 Claims, 7 Drawing Figures

AIRCRAFT ENGINE FLEXIBLE FLUID DAMPED COUPLING

BACKGROUND OF THE INVENTION

1. Field of the Invention

The present invention relates to flexible couplings with built-in damping and is of particular utility as incorporated in light aircraft engines. While the invention is of general utility in coupling a prime mover to a load, it is shown as incorporated in a reciprocating aircraft engine system.

For years torsional vibrations in light aircraft reciprocating engines have been a significant problem. The reason for this is that an aircraft engine must be light in weight, so it has no heavy flywheel to limit the torsional vibrations. While it is connected to a large propeller the effective inertia that the engine realizes is rather small because of the propeller's own flexibility. With no substantial flywheel attached to the engine's rotating system, torsional vibration problems are present. These include possible gear failures in the reduction gearbox and the accessory gears in a geared engine and in the accessory gears in a direct drive engine. Problems may also be present in the accessories attached to the engine, such as fuel pumps, alternators, compressors, hydraulic pumps and the like. The propeller is also affected by the engine's vibratory impulses. In fact, the propeller is one of the major contributors to the vibration problems. Since it has blade flexibility that can produce frequencies that coincide with the engine's frequencies, the problem is aggravated. The invention provides an improved solution to the problem.

2. Description of the Prior Art

Attempts have been made in the past to solve these problems by incorporating tuned counterweights on the engine's crankshaft to reduce the firing impulses produed by the engine. In some cases the necessity to control other frequencies by this type of counterweight makes the problem more difficult since there is sufficient room in the engine for only a limited number of weights.

This system of counterweights is generally effective in protecting engine parts, accessories and the propeller. However, they are relatively complicated in manufacture, heavy and expensive to produce, particularly if they are incorporated in a high speed, small four-cylinder engine.

Our U.S. Pat. No. 3,834,181 issued Sept. 10, 1974, entitled "Aircraft Engine Flexible Coupling" and assigned to Avco Corporation, represents one of the more advanced prior art types. A rotating input member is provided with radially inwardly extending discs. A concentric output member has radially outwardly extending discs alternately arranged in relation to the first-mentioned discs. Ring-like elastomer members are disposed between the metallic discs to provide elastic coupling and damping. Relative movement of the inner and outer members is limited by tooth and notch engagement.

In U.S. Pat. No. 2,394,405 to Schjolin the drive is via a torsionally elastic quill shaft. U.S. Pat. No. 2,738,660 to Gail shows an elastic quill shaft in combination with loosely mating splines between which damping fluid is introduced. U.S. Pat. No. 1,965,742 to Junkers shows a combination generally similar to that of Gail.

U.S. Pat. No. 3,263,450 to Condon illustrates the complexities which arise in the use of a torsion bar in combination with tooth and notch engagement between inner and outer sleeves for providing the damping effect. Particular attention is invited to the complex system for supplying and circulating the viscous damping fluid in the Condon structure.

In the system of the Happ et al. U.S. Pat. No. 2,910,843 inner sleeves and outer sleeves are in effect intercoupled by a plurality of metallic discs, dimple and cut-out formations providing for elasticity and looseness of play. Resilient synthetic materials are disposed between the discs.

The Geislinger torsional coupling has an outer drive member and an inner driven member and a number of leaf spring packs radially projecting from the driving member into slots in the driven member. The pockets between the leaves are filled with spacers.

The above discussed references are believed to be fairly representative of the more pertinent prior art.

SUMMARY OF THE INVENTION

The invention provides a flexible coupling which isolates the engine from the reduction gear and/or propeller by placing the major resonant frequency of the system below the speed range of the engine. Incorporated in the flexible coupling is a viscous fluid damper which limits the vibratory amplitude of the system to a safe level when making the transition through the resonant condition.

A primary object of the invention is to provide a coupling system which minimizes torsional vibrations in the engine and associated components and also reduces the propeller blade stresses to a safe level at all times.

Another object of the invention is to provide a coupler which is of lesser length than the torsion bar versions.

A further object is to provide a coupler in which the arrangements for supply and circulation of viscous damping fluid are relatively simple.

It is also an object of the invention to provide a coupler having relatively high damping capacity.

Other objects of the invention are to provide a coupler which is: (1) cheaper to build; (2) not subject to sludge problems; and (3) not troubled by a non-uniform damping medium.

This coupling has two main and distinct functions that are predetermined by the horsepower range and type of engine being considered. For a particular engine the spring rate of the coupling is selected so that the natural frequency of the rotating system (includes engine and propeller) for the predominate order is located above the idle speed but well below the normal operating speed range of the engine. Damping of the torsional vibrations is controlled by a viscous fluid which has the ability to limit the torsional oscillation of the spring coupling to a safe level for the brief period that the engine is exposed to this resonant condition.

In one configuration, this coupling with the damper is interconnected between the front end of the crankshaft and the planetary reduction gear of the engine. It has its own housing which is inserted between the reduction gear housing and the crankcase, making the coupling and damper integral with the engine. The damping device is located around the outside of and connected to each end of the spring coupling.

For a better understanding of the invention, together with other and further objects, capabilities and advantages thereof, reference is made to the following description of the accompanying drawings.

DETAILED DESCRIPTION OF THE INVENTION

Figure 1:
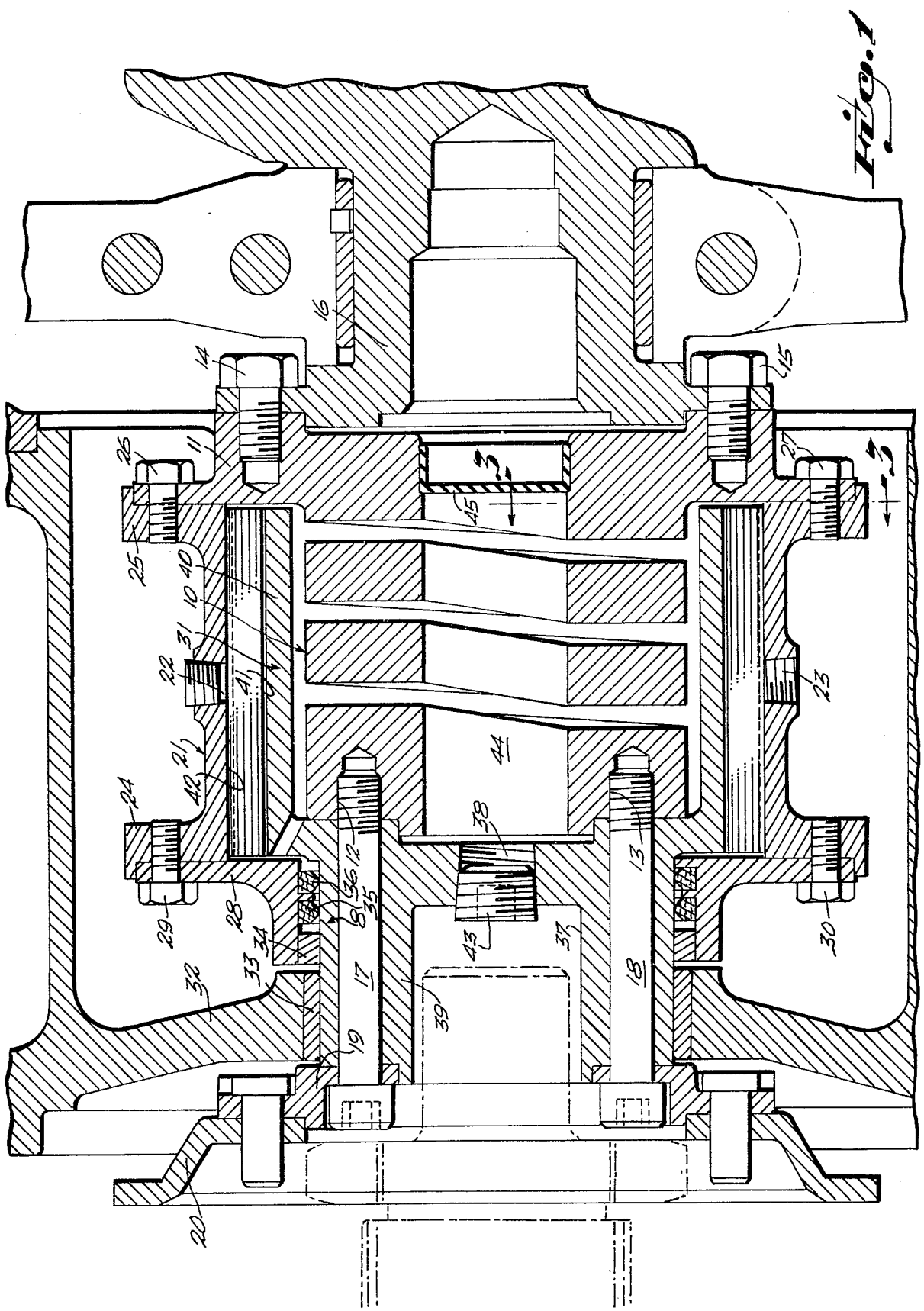
FIG. 1 is a cross-sectional view through a preferred form of coupler in accordance with the invention, as taken on its central axis.
Figure 2:
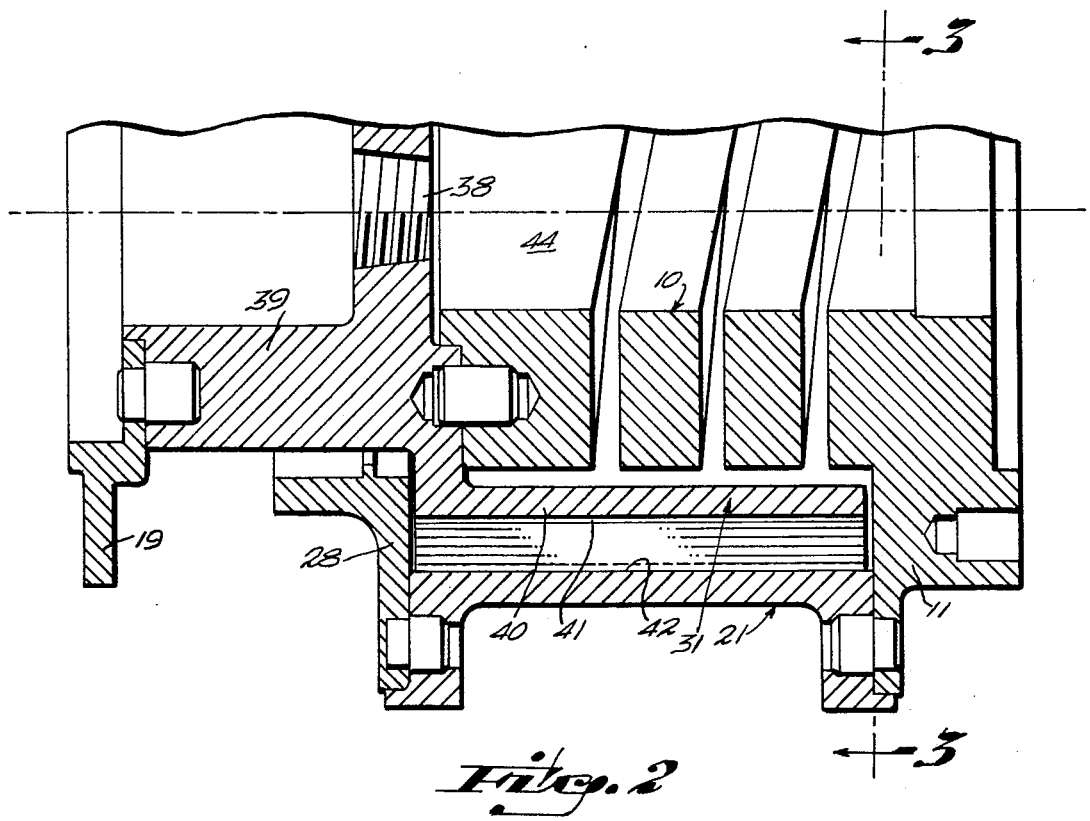
FIG. 2 is a fragmentary exploded sectional view of the FIG. 1 embodiment.
Figure 3:
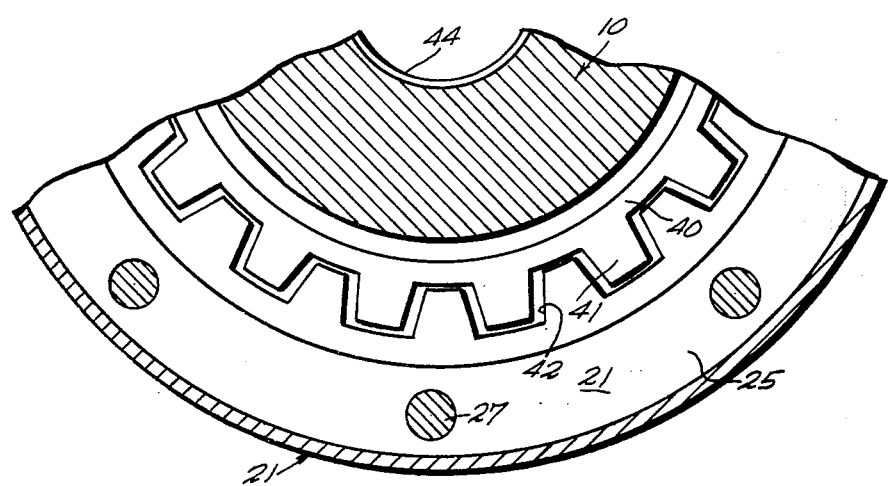
FIG. 3 is a fragmentary sectional view as taken along line 3—3 of FIGS. 1 and 2.
Figure 4:
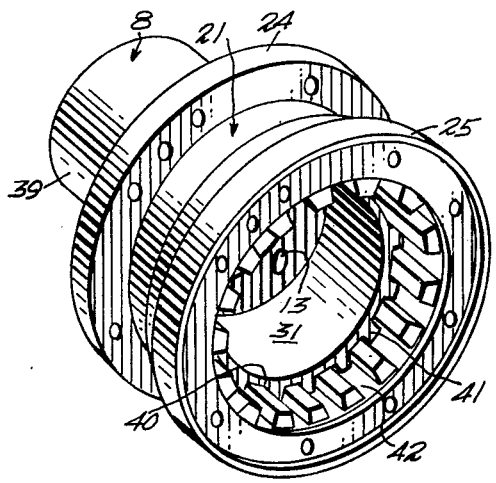
FIGS. 4 and 5 are perspective views showing the principal parts of our improved coupler, as disassembled.
Figure 5:
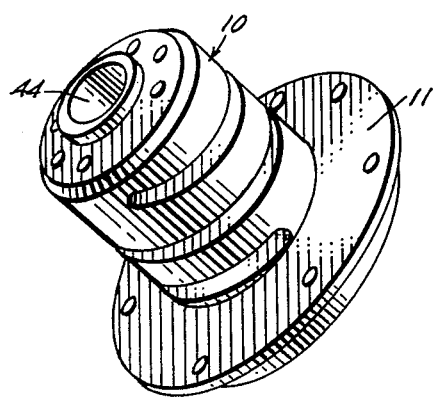

The helical torsional spring element in our coupler is designated by the reference numeral 10. It is machined from a hollow metal tube and is formed with a flange 11 at the aft end and tapped holes, such as 12 and 13, at the fore end. The flange end is attached, as by bolts 14 and 15, to a drive member of crankshaft 16. The other or fore end of the helical torsional element is attached, as by bolts 17 and 18, to an adapter or driven member 19 which in turn is connected to the drive plate 20 for the planetary reduction gear system. The output of the reduction gear system is connected to the propeller. The helical spring 10 is designed to produce a certain stiffness or spring rate so that when calculated with the inertia of the engine versus the propeller the natural frequency of the system is located at a predetermined engine speed.

Another principal element of the coupler is the barrel member 21 which is generally cylindrical in configuration and formed with vents 22 and 23 and annular flanges 24 and 25. Flange 25 is secured to the flange end 11 of the helical spring member as by bolts 26 and 27. Bolts 14, 15, 26 and 27 fasten drive member 16 and barrel 21 and flange 11 in rigid relation. Inner sleeve member 31 has a forwardly extending reduced portion 8 located in concentric relation to the coupling housing 32 by a bearing 33 and in concentric relation to the reduced portion of the bearing plate 28 by a bearing 34 and seals 35 and 36. The bearing plate is effectively a part of the barrel and it seats 35 and 36. This reduced portion is formed to provide a recess 37 and a filler plug opening 38. Aft of the inner recess 39 of the reduced portion of the inner sleeve member 31 is the diametrically enlarged portion 40 which is substantially coextensive in length with the internal bore of barrel 21 and is provided with radially extending tooth formations, such as 41, loosely complementary to the notch formations 42 formed in the barrel member 21. Plug opening 38 is filled by filler plug 43 to close up the internal cylindrical fluid reservoir 44. The aft end of the internal bore in flange 11 is closed by plug 45. Bolts 17 and 18 fasten the front end of spring 10, sleeve 31 and driven member 19 in rigid relation. Sixteen teeth and notch sets constitute a workable parameter but the invention is not limited to this particular number. The teeth are within the notches and are of a certain width so situated that an equal amount of clearance can be obtained at each side and at the ends. The cavity developed by this assembly and formed within the chamber defined by barrel 31, bearing plate 28, seal 36, web portion of sleeve 31 and flange 11 is filled with a fluid which is then forced back and forth across the teeth when deflection is imposed on the spring coupling. The amount of damping created by this design is controlled by the following factors: the radius to the center of the teeth; the height of the teeth; the clearance of space around the teeth; and the viscosity of the fluid.

Figure 6:
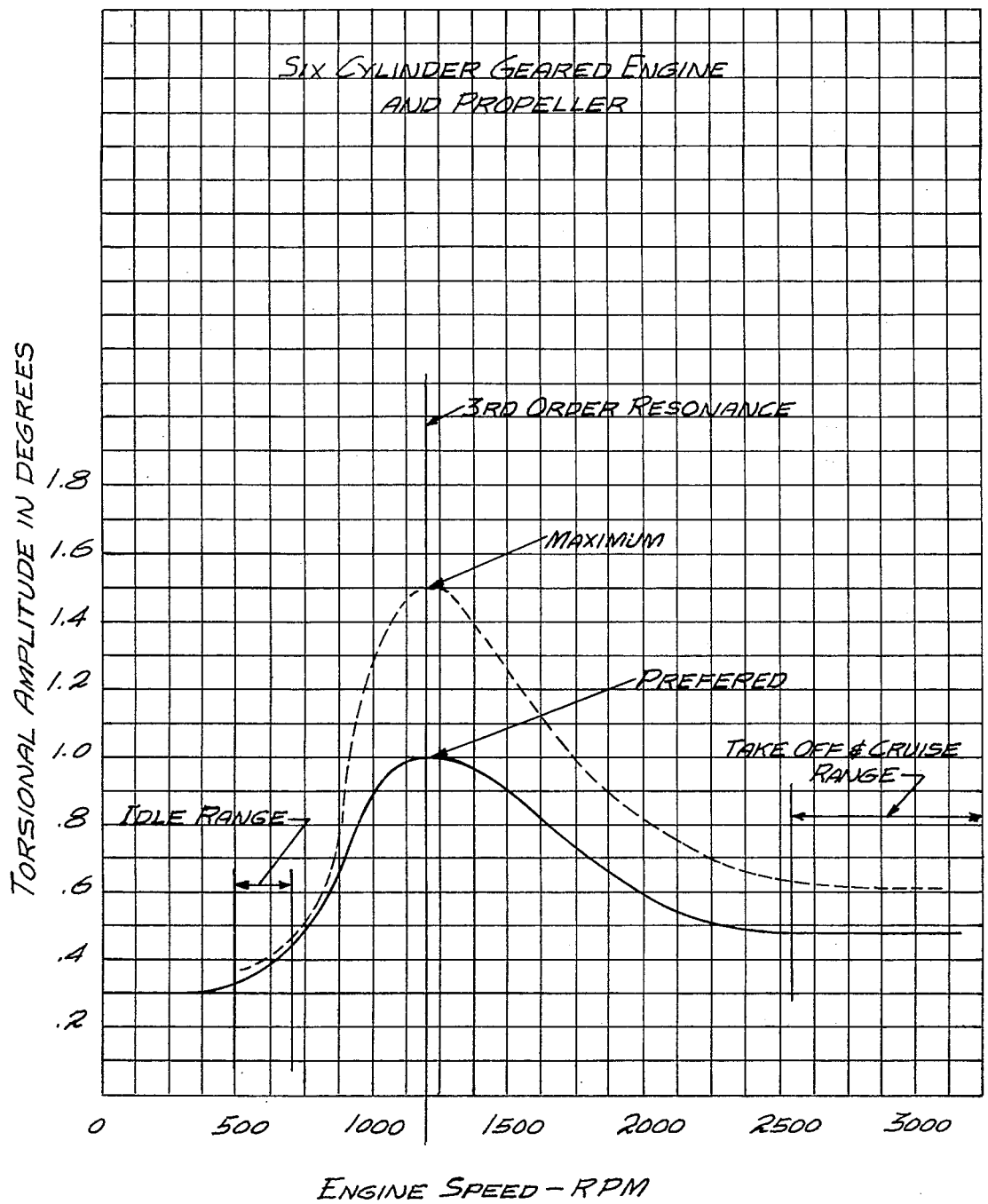
FIGS. 6 and 7 are sets of curves, in each case on Cartesian frameworks of coordinates, used as aids in illustrating the principles and operation of the invention.

The curves in FIG. 6 (torsional amplitude as ordinates vs. speed as abscissae) indicate a system that has been reduced to practice and was tested to evaluate the torsional spring fluid damped coupling. The engine used for this test was the six-cylinder, geared Lycoming IGO-540, rated at 350 HP at 3400 RPM. The inertia of the engine was 1.0 lb. in sec.$^2$ and the inertia of the propeller corrected for speed was 13.0 lb. in sec.$^2$ with the stiffness of the coupling set at 178,000 lbs. in. per radian. The predominant third order vibration was fixed at 1200 RPM engine speed.

The damping requirements for this combination of engine and propeller must be sufficient to limit the third order amplitude at the resonant position to no more than ± 1.5°. FIG. 6 indicates the conditions as calculated. Experiments with bench test fixtures were conducted to determine the damping ability of various fluid viscosities at different clearances in the damper. The results of these tests indicate that a range of clearances and fluid viscosities can be used in the coupling to obtain the required amount of damping. The fluid used in the test apparatus which gave the best damping was Dow Corning 200 with a viscosity range from 20 centistokes to 60,000 centistokes. The clearances in the parts ranged from 0.020 to 0.040.

The damping obtained in the actual engine test (for limiting the third order amplitude) was adequate for a number of the fluid viscosities tested which ranged from 5000 CS to 60,000 CS with a nominal clearance in the parts of 0.035 inches. However, the fluid that gave the best overall results for the engine's torsional amplitude and propeller blade stresses was the 10,000 centistokes Dow Corning 200 fluid.

Figure 7:
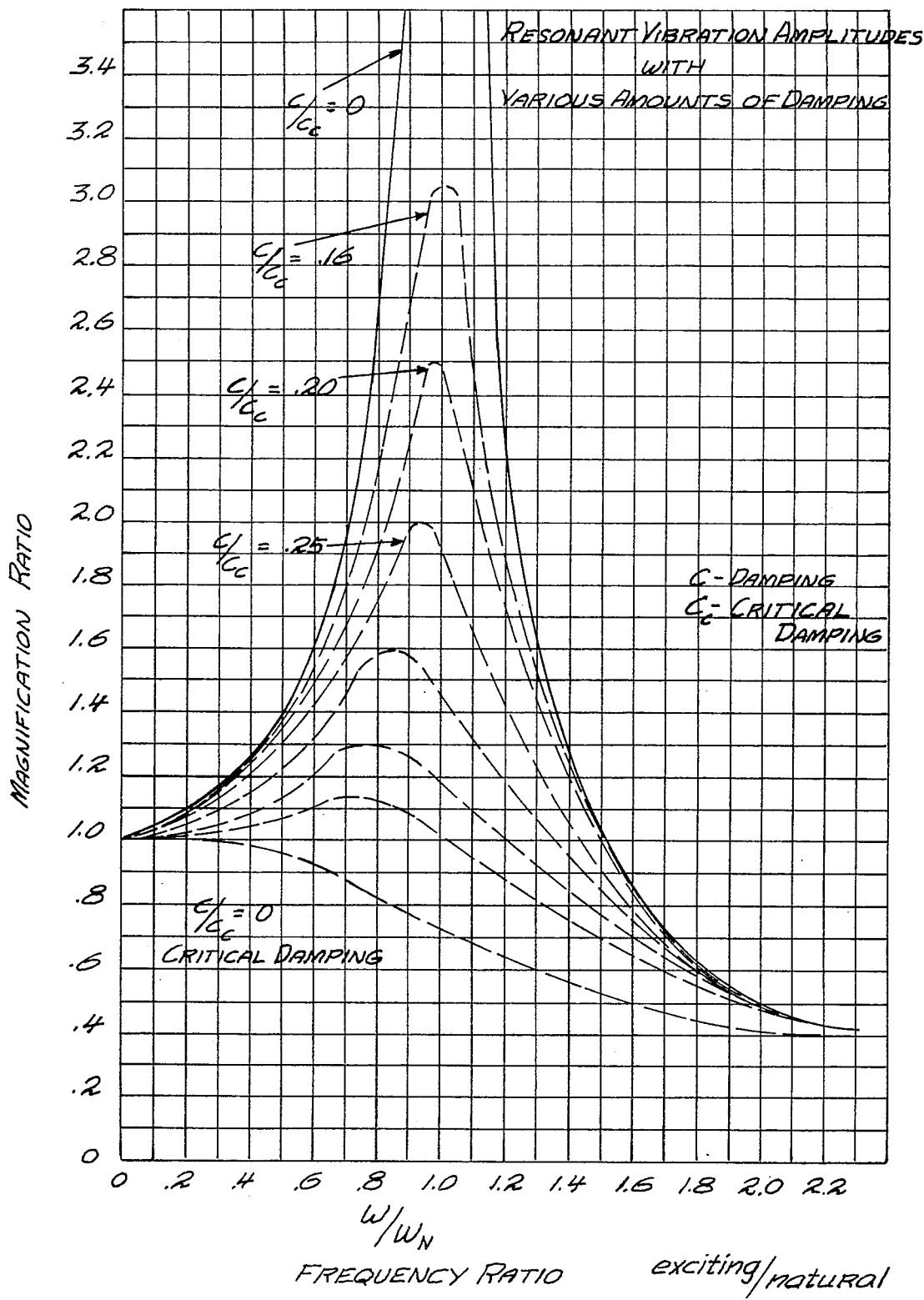

The theory that the damping criteria are based on is shown on the attached FIG. 7. For this application an internal damping factor of $C/C_c$ is preferably over 0.20 where the frequency ratio of 1 occurs between idle and the lowest usable cruise speed (1200 RPM). From FIG. 7 this would result in a magnification ratio of 2.5. If the engine has a maximum torsional amplitude of 0.50° at non-resonant speeds, then the amplitude at resonance (1200 RPM) would be 2.5 × 0.50 = 1.25°.

In the actual engine test with the 10,000 centistokes fluid the damping factor was very close to the 0.20 value. Under most running conditions of the test program, such as propeller load and full power, the measured amplitude at the rear of the crankshaft at non-resonance was ± 0.60 and at resonance the amplitude was ± 1.25°. These two values give a magnification factor of 2.08 which, from FIG. 7, is a $C/C_c$ of 0.25. In FIG. 7 magnification ratios are plotted as ordinates and frequency ratios as abscissae.

The spring element 10 has a number of special features. It is machined from a solid forged bar of steel to look like a rectangular section coil spring. The outside diameter is ground and the inside diameter is machined by boring. The slot is machined with a certain helix to represent the lead or number of turns (coils) of the spring. Slotting the spring in the manner as illustrated leaves both ends solid for attaching purposes. The material used for the actual part as tested is Vasco Max 300 Maraging steel. It was selected for its high strength, high endurance limit, ease of machining, low distortion during heat treating and low modulus of elasticity. Standard type steels can be used.

The reason a silicon fluid is preferred for use in this damper is due to its small change in viscosity at increased temperatures. Since the parts are assembled in the engine proper, the maximum temperature in the coupling from engine operation is approximately 250°F.

This disclosure presents a viscous damped torsional spring coupling for a geared engine incorporated inside its own housing, assembled between the crankcase and reduction gear housing. The complete unit can be incorporated within the crankcase itself for either a geared engine or a direct drive engine.

A fail safe feature is incorporated. The engagement of the internal and external teeth which normally act as the damping members under standard operating conditions can withstand the engine torque for a limited period of time. This fail safe feature has been demonstrated while the engine was running on the flight stand.

The invention provides
a flexible mechanical coupling for transmitting power from an engine to a load, comprising, in combination:
a drive member 16 rotatable with the engine,
a driven member 19 rotatable with the load,
a generally cylindrical sleeve 31 having a first portion 8 formed with an annular bearing surface and a central normally plugged port 38 and a second portion formed with a set of radially extending teeth 41,
a helical torsional spring 10 formed with a flanged aft end 11 and an internal bore 44 registering with said port,
means 17, 18 for fastening the driven member and the front end of the sleeve and the front end of the spring in rigid relationship,
a generally cylindrical barrel 21, 28 in concentric embrace in relation to said sleeve, said barrel having a set of internal notches 42 in loose complementary engagement to said teeth,
means 14, 15, 26, 27 for fastening said drive member and the flange end 11 of said spring 10 and said barrel 21, 28 in rigid relationship,
viscous damping fluid supplied through said port 38 into said bore 44 and circulating within the chamber provided by said barrel and the flange end of said spring, and
bearing and seal means 35, 36 embracing said annular bearing surface of said sleeve, said barrel including means 28 providing a seat for said bearing and seal means.

While there has been shown what is at present considered to be the preferred embodiment of the invention, various modifications and changes may be made therein without departing from the proper scope as defined in the appended claims.

Having described our invention, we claim:

1. A flexible mechanical coupling for transmitting power from an engine to a load, comprising, in combination:
a drive member rotatable with the engine,
a driven member rotatable with the load,
a generally cylindrical sleeve having a first portion formed with an annular bearing surface and a central normally plugged port and a second portion formed with a set of radially extending teeth,
a helical torsional spring formed with a flanged aft end and an internal bore registering with said port,
means for fastening the driven member and the end of the first sleeve portion and the front end of the spring in rigid relationship,
a generally cylindrical barrel in concentric embrace in relation to said sleeve, said barrel having a set of internal notches in loose complementary engagement to said teeth,
means for fastening said drive member and the flange end of said spring and said barrel in rigid relationship,
damping fluid supplied through said port into said bore and circulating within the chamber provided by said barrel and the flange end of said spring, and
bearing and seal means embracing said annular bearing surface of said sleeve, said barrel including means providing a seat for said bearing and seal means.

2. A flexible mechanical coupling for transmitting power from an engine to a load comprising, in combination:
a generally cylindrical sleeve formed with a set of radially extending teeth and having a front face and a rear end,
a helical torsional spring formed with a flanged end and a front end and an internal bore,
means for fastening the front ends of said sleeve and spring in rigid relationship,
a generally cylindrical barrel in concentric embrace of said sleeve, said barrel having a set of internal notches in complementary engagement to said teeth,
the sleeve and barrel being related to each other, through said teeth and notches, as driven and driving members in the event of breakdown of said spring,
means for fastening the flanged end of said spring and said barrel in rigid relationship, and
viscous dampling fluid stored in said bore and adapted to flow within the spaces between said notches and teeth, said face being formed with a fluid supply opening.

3. A flexible mechanical coupling for transmitting power from an engine to a load comprising, in combination:
a generally cylindrical sleeve having a front face and a rear end,
a helical torsional spring formed with a flanged end and a front end and an internal bore,
means for fastening the front ends of said sleeve and spring in rigid relationship,
a generally cylindrical barrel in concentric embrace of said sleeve, said barrel and sleeve being formed with complementary sets of teeth and notches,
the sleeve and barrel being related to each other, through said teeth and notches, as driven and driving members in the event of breakdown of said spring,
means for fastening the flanged end of said spring and said barrel in rigid relationship, and
viscous damping fluid stored in said bore and adapted to flow within the spaces between said notches and teeth, said face being formed with a fluid supply opening.

4. A flexible mechanical coupling in accordance with claim 3 in which the parameters of the spring are such that the predominate order of vibration is located above the idle speed but well below the normal operating speed range of the engine when the sleeve is rotatable with a load and the barrel is rotatable with an engine.

5. A flexible mechanical coupling in accordance with claim 4 in which the characteristics of the damping fluid are such that the coupling has an internal damping factor $C/C_c$ of at least 0.25.

* * * * *